UNITED STATES PATENT OFFICE.

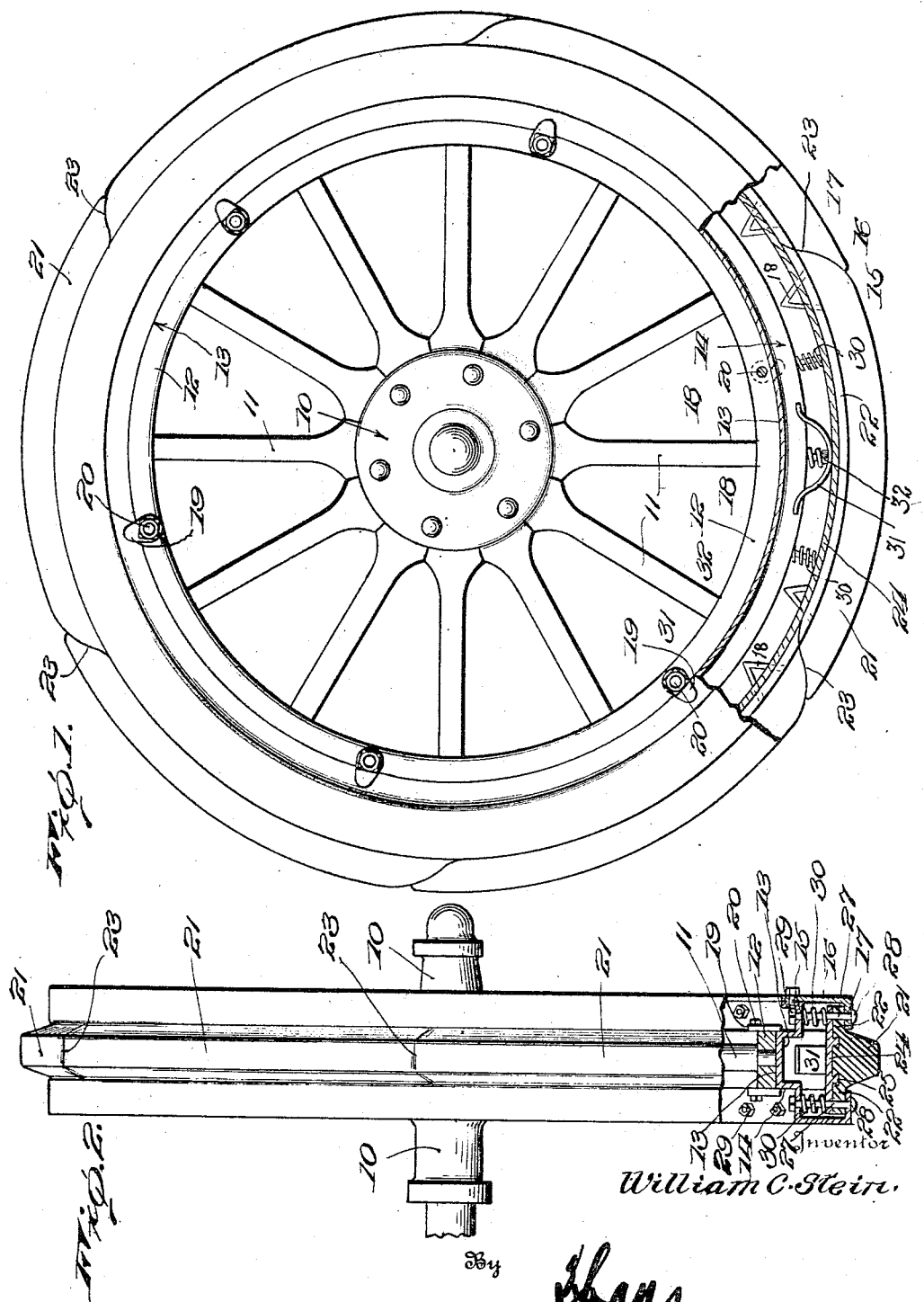

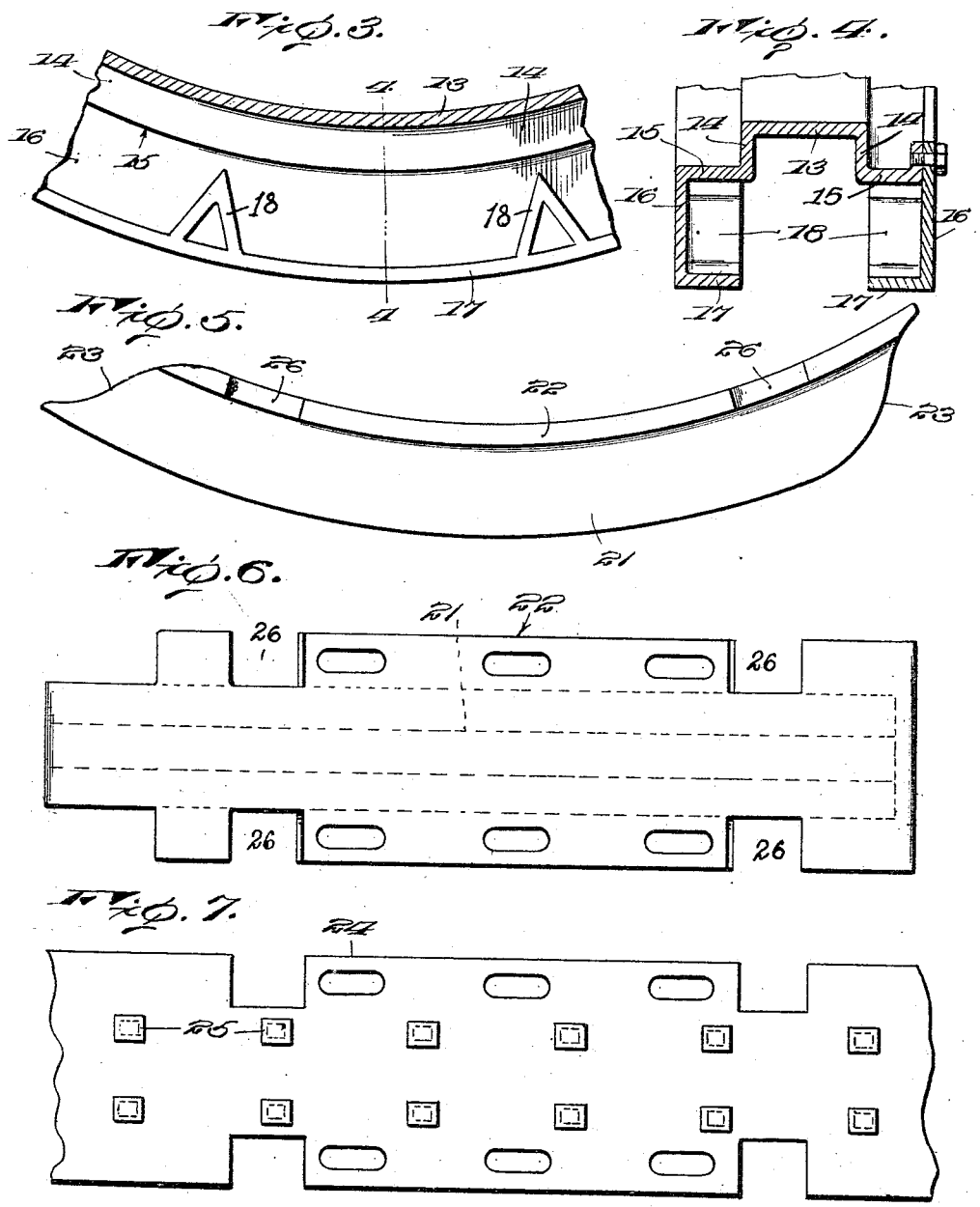

WILLIAM C. STEIN, OF BUFFALO, NEW YORK.

RESILIENT TIRE.

1,267,707.   Specification of Letters Patent.   Patented May 28, 1918.

Application filed December 31, 1917. Serial No. 209,692.

*To all whom it may concern:*

Be it known that I, WILLIAM C. STEIN, a citizen of the United States, residing at Buffalo, in the county of Erie and State of New York, have invented certain new and useful Improvements in Resilient Tires, of which the following is a specification.

This invention relates to improvements in resilient wheels, more particularly to wheels employed under automobiles, auto trucks, and similar vehicles, and designed to replace the ordinary pneumatic tire, and has for one of its objects to simplify and improve the construction and increase the efficiency and utility of devices of this character.

Another object of the invention is to provide a device of this character adapted to be applied to the fellies of wheels of various forms and sizes, and which may likewise be applied to the body portions of automobile wheels in common use.

With these and other objects in view, the invention consists in certain novel features of construction as hereinafter shown and described and then specifically pointed out in the claims; and in the drawings illustrative of the preferred embodiment of the invention—

Figure 1 is a side elevation partly in section, of one of the improved wheels.

Fig. 2 is an edge view partly in section of the structure shown in Fig. 1.

Fig. 3 is an enlarged sectional detail of a portion of the rim of the improved wheel.

Fig. 4 is a transverse section on the line 4—4 of Fig. 3.

Fig. 5 is an enlarged side elevation of one of the yieldable tire sections.

Fig. 6 is a plan view of the structure shown in Fig. 5.

Fig. 7 is a plan view of a portion of the bearing plate.

The improved device may be applied without material structural change to wheels of various forms and sizes, but for the purpose of illustration is shown applied to the body portion of a conventional automobile wheel in which 10 represents the hub, 11 the spokes, and 12 the felly.

The improved device includes a rim bearing around the felly 12 and comprising a central annular portion 13, having outwardly directed flange portions 14 at the edges of the portion 13, flange portions 15 directed laterally from the outer edges of the flange portions 14, outwardly directed web portions 16 directed outwardly from the outer edges of the lateral flange portions 15, and flange portions 17 directed inwardly from the outer edges of the web portions 16. One of the flange portions 16 will be detachably connected to the adjacent flange portion 15, to permit the parts to be assembled. The structure above noted is clearly shown in Figs. 3 and 4.

Directed inwardly from the outer flange portions 17 are a plurality of projections 18, preferably V-shaped, and spaced at uniform distances.

The base portion 13 of the rim corresponds in width to the outer face of the felly 12, and bears thereon as represented in Fig. 2. The rim member is held in position upon the felly by a plurality of clip devices 19 secured in place by clamp bolts 20. Any required number of the clip devices may be employed but six will generally be found sufficient as shown in Fig. 1.

The tire portion of the improved device is preferably formed of a plurality of segmental sections of rubber or like material and each comprising an outer bearing portion 21 and laterally directed flange portions 22. The tire sections are inserted in the space within the rim member with the bearing portion 21 extending outwardly between the flange portions 17, and the flange portions 22 bearing against the inner face of the flange portions 17 as shown more clearly in Fig. 2. At their ends the tire sections overlap, the contiguous faces of the overlapping portions being preferably reversely curved as illustrated at 23. When applied the tire sections completely fill the circumference of the wheel as illustrated in Fig. 1. An annular bearing plate 24 engages against the inner faces of the tire sections, the plate being provided with a plurality of outwardly directed lugs 25 as shown in Fig. 2, preferably slightly dove-tailed, and engaging in recesses within the material of the tire sections when applied.

The material of the tire sections is naturally compressed around the lugs and thus cause them to serve as anchor devices to firmly hold the tire sections in position.

Any required number of the tire sections may be employed, but six will generally be used as shown, and two pairs of the lugs 18 will be located between the ends of each tire section. The flange portions 22 of the tire sections are provided with lateral cavities or seats 26 where the lugs 18 occur and adapted to inclose the lugs, which will thus serve to prevent circumferential or "creeping" action of the tire sections relative to the rim and the felly portion of the wheel. The member 24 is also provided with lateral cavities or seats 28 corresponding to the seats 26, to receive the stop members 18.

The lateral flange portions 15—17 of the rim member are connected at suitable intervals by bolts 27, each having a rounded head 28 externally of the flange portion 17 and a clamp nut 29 upon the other end internally of the flange portion 15. The bolts pass through the plate member 24 and likewise through the flange portions 22 of the tire sections, the apertures for the bolts in the parts 24 and 22 being slotted as shown in Figs. 6 and 7, to permit a certain free movement of the tire sections and plate circumferentially of the wheel, to prevent cramping. Surrounding each bolt 27 between the plate 24 and the flange portion 15 is a coiled spring 30, which thus serve to maintain the plate 24 and the tire sections yieldably in outward position, or with the flanges 22 of the tire sections in contact with the flange portions 17 of the rim.

The springs 30 will possess sufficient strength to maintain the parts in their normal correlation under ordinary strains, but in event of an abnormal load being applied to the vehicle the springs will cause the tire sections to yield and prevent jars and concussions being communicated to the body portion of the vehicle. By this arrangement it will be obvious that an efficient resilient tire is produced, which will operate in substantially the same manner as an ordinary pneumatic tire without the objectionable features of the latter.

The springs 30 will be sufficient to prevent abnormal depression of the tire sections under ordinary loads, but to enable the wheel to successfully resist the depression caused by abnormal loads, a plurality of leaf springs 31 are connected to the inner face of the annular member 24 at suitable intervals as illustrated in Fig. 1. Each of the leaf springs is secured in position by a clamp screw 32 or like device. Any required number of the leaf springs may be employed, and will be arranged in sufficiently close proximity to produce the desired results, and effectually resist any abnormal depression of the tire sections under abnormal strains.

The springs 31, it will be noted, do not engage the base portion 13 of the rim and thus become active unless an abnormal load is placed on the vehicle or when the latter drops into a depression or meets with an obstruction.

The springs 31 are emergency springs and remain quiescent under ordinary conditions.

Having thus described the invention, what is claimed as new is:

1. In a resilient wheel, a rim adapted to bear upon a wheel felly and including laterally directed inner and outer flanges in spaced relation, a plurality of stops extending inwardly from said outer flanges, a tire formed of a plurality of yieldable sections each including a tread portion extending beyond the outer flanges and lateral flanges bearing against the outer lateral flanges of the rim, said tire flanges having recesses to receive said stops, and yieldable devices operating to maintain said tire sections normally in outer position.

2. In a resilient wheel, a rim adapted to bear upon a wheel felly and including laterally directed inner and outer flanges in spaced relation, a plurality of stops extending inwardly from said outer flanges, a tire formed of a plurality of yieldable sections each including a tread portion extending beyond the outer flanges and lateral flanges bearing against the outer lateral flanges of the rim, an annular bearing plate engaging the inner faces of the tire sections, said tire flanges and said bearing plate having registering recesses to receive said stop, and yieldable devices operating to maintain said bearing plate and tire sections normally in outer position.

3. In a resilient wheel, a rim adapted to bear upon a wheel felly and including inwardly opening annular channels, a tire formed of a plurality of yieldable sections each including a tread portion extending beyond the rim and lateral flange portions engaging in said channels, yieldable devices within said channels and bearing against the tire flanges, and auxiliary yieldable devices connected relative to the body portions of the tire sections and operating to engage the inner portion of the rim when the tire sections are abnormally depressed.

4. In a resilient wheel, a rim adapted to bear upon a wheel felly and including inwardly opening annular channels, a tire formed of a plurality of yieldable sections each including a tread portion extending beyond the rim and lateral flange portions engaging in said channels, an annular bearing plate engaging the inner faces of the tire sections, yieldable devices within said channels and operating to maintain the plate and the tire sections in normal position, and auxiliary yieldable devices connected to said plate and operating to engage the inner portion of the rim when the tire sections are abnormally depressed.

In testimony whereof I affix my signature.

WILLIAM C. STEIN. [L. S.]

Copies of this patent may be obtained for five cents each, by addressing the "Commissioner of Patents, Washington, D. C."